United States Patent
Fischer

(10) Patent No.: US 8,561,174 B2
(45) Date of Patent: Oct. 15, 2013

(54) AUTHORIZATION METHOD WITH HINTS TO THE AUTHORIZATION CODE

(76) Inventor: Igor Fischer, Cologne (DE)

(*) Notice: Subject to any disclaimer, the term of this patent is extended or adjusted under 35 U.S.C. 154(b) by 748 days.

(21) Appl. No.: 12/139,519

(22) Filed: Jun. 16, 2008

(65) Prior Publication Data
US 2010/0005525 A1    Jan. 7, 2010

(51) Int. Cl.
- *G06F 7/04* (2006.01)
- *G06F 12/00* (2006.01)
- *G06F 12/14* (2006.01)
- *G06F 13/00* (2006.01)
- *G06F 17/30* (2006.01)
- *G11C 7/00* (2006.01)

(52) U.S. Cl.
USPC .................................................. 726/21

(58) Field of Classification Search
USPC .................................................. 726/21
See application file for complete search history.

(56) References Cited

U.S. PATENT DOCUMENTS

| | | | |
|---|---|---|---|
| 5,425,102 A | 6/1995 | Moy | |
| 5,754,176 A | 5/1998 | Crawford | |
| 5,805,674 A | 9/1998 | Anderson, Jr. | |
| 2004/0054929 A1* | 3/2004 | Serpa | 713/202 |
| 2005/0144462 A1 | 6/2005 | LaGarde | |
| 2008/0184035 A1* | 7/2008 | Iyer et al. | 713/183 |
| 2009/0300755 A1* | 12/2009 | Pakhunov | 726/18 |

FOREIGN PATENT DOCUMENTS

| | | |
|---|---|---|
| WO | 01/44916 A2 | 12/2000 |
| WO | 2006/123899 A1 | 11/2006 |

* cited by examiner

*Primary Examiner* — Edan Orgad
*Assistant Examiner* — Harris Wang
(74) *Attorney, Agent, or Firm* — Keith Orum

(57) ABSTRACT

Authorizing a user for accessing a system, data, or a physical location is accomplished by receiving an authorization code from the user and determining whether the received code matches a valid authorization code. To relieve the user from the need of memorizing complex authorization codes, the authorizing party presents hints to a valid authorization code. The hints are presented concurrently with the user's entering of the authorization code.

11 Claims, 3 Drawing Sheets

AUTHORIZATION METHOD WITH HINTS TO THE AUTHORIZATION CODE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Computer-based systems and services are often configured to grant access only to authorized users. A simple yet effective mean of authorization is to ask the user to enter some secret information (authorization code) known only to authorized users and the system or service. In many cases, for increased security, the computer does not store the authorization code, but some related information, like its hash or digest, a predefined value encrypted using the code, or similar. The information can be easily computed from the authorization code, but computing the code back from the information is not feasible. Authorization can be anonymous, that is, without computer checking or even knowing the user's identity. An example of anonymous authorization is entering a calling card number when placing a phone call. The machine which validates the code and grants connection does not know the identity of the caller, nor any other personalized information.

For accessing personal data or personalized services, authorization is usually tied to user identification. In such cases, the secret information have the purpose of authenticating the user. Obtaining access to a system or service is a two-step process: First, the user provides an identification, commonly referred to as "user name" or "log-in name", which is normally not confidential. Some operating systems allow the user to choose a user account from a displayed list of available accounts. Such systems may also allow users to choose an image to be displayed in the list, beside or instead of the user name. In the second step, the user provides a secret code, mostly referred to as "password", "personal identification number", or, abbreviated, "PIN", which is associated with the identification. Only the legitimate user is supposed to know the password for the user name and the access is granted only if the provided user name and the password match. In some systems, for increased security, additional access codes can be required. For example, some on-line banking services, in addition to authenticating the user, require a unique transaction authorization number ("TAN") for every transaction.

The above, two-step, log-in/password process is often used even when simple authorization (anonymous authorized access) is the actual purpose. For example, in Unix-like operating systems there is only one "root" user account, but there may be many system administrators who need to have "root" privileges. In such case, the same root password is used by all administrators. The user name "root" is not used in a sense to identify a user or administrator, but to request a certain privilege level, and the password serves as the authorization code, the proof that the user is one of the administrators.

The user name/password authentication scheme is very popular because of its low cost and simple implementation and usage. But, it has its drawbacks. For a reasonable security, the password must be hard to guess by an adversary, which is commonly achieved by choosing a long and complex password. Most users have difficulties memorizing such passwords and might be tempted to write them down. If the paper (or other carrier) with the password gets lost or stolen, its owner loses the ability to access the system or service, but the founder/thief gets it. Even worse, the password may be copied without user's knowledge, so the user is not even aware of the attack. If the same password is used for accessing different services, they all get compromised by a single attack. Therefore, security-savvy users chose many different passwords, preferably one for each service they use. The highest security is obtained by having a different, complex password for every service and memorizing all these passwords, but, as noted above, this is too difficult for most users.

Because forgetting a password is such a common problem, most password-based services offer their users a possibility to recover it, generate a new password, or to display hints to it. In the former two cases, the new or recovered password is usually communicated to the user over a separate channel, e.g. over e-mail. The underlying assumption is that only the user can access the e-mail. In other words, the security of the new password is tied to the security of the user's e-mail account. If the e-mail account gets compromised, the attacker can obtain access to every other service which offers this kind of password recovery. Alternatively, the password can be recovered or a new one generated only after the user gives a correct answer to a security question, for example "What is your mother's maiden name". This approach either reduces security, because the security question is easy to answer, or, if the question is hard, the answer is yet another secret code to remember. In the setup where the user can request hints to the password, the security of the system depends solely on the security of the hints. As with the security question, either the hint is explicit and can also help the attacker, or it is convoluted and of little help to the user.

Theoretically, users could use the above password recovery schemes to avoid memorizing passwords, except the one for the e-mail account or the answer to security question or hint. For each access to a service, they could claim to have forgotten the password and generate a new one. In practice, however, this is not very convenient, because additional steps must be performed to gain access to the account and because, if the e-mail channel is used, sending the password is likely to take some time, usually between several seconds and several minutes. Also, the new password should remain secret until obsoleted by a yet newer one. If it is displayed to the user, there is a danger that someone else could also obtain knowledge of it, for example by looking over the user's shoulder.

To relieve users from the need of memorizing long and complex passwords, authentication can be based on hardware in user's possession, like a smart card or some other hardware token. Although copying such tokens is usually too expensive for an attacker, they are usually easy to steal or lose, similar to a piece of paper with the password written on it. Therefore, pure hardware-based authentication methods are rare and in most cases the user is still required to provide some secret code in addition to the token. Since most of the security comes from the token, passwords can be shorter and simpler than in pure password-based authentication. The drawback of this approach is that it requires a costly hardware infrastructure for reading the tokens. For example, if a web-based e-mail service were to authenticate its users by smart cards, the users would need to have a smart card reader available wherever they access the service: at home, at work, from Internet cafés etc. Such a wide infrastructure of smart card readers currently does not exist and, taking into account that smart cards are a 30 years old technology, probably never will.

Instead of authenticating users based on what they know (the password) or possess (the token), authentication can be based on users' biometric properties, like fingerprints, iris or face appearance, properties of their voice, and similar. Although effective, these approaches are mostly complex to implement and use and, like token-based authentication, require costly hardware infrastructure. Also, there are privacy issues involved. For example, fingerprints are sensitive personal information and users might be reluctant to make them known to third-party readers or services.

Software-based password enhancement methods may trade password complexity for some other information which are supposedly easier to remember, for example pace or rhythm at which they are entered. Such methods are inexpensive and increase password security, but they do not relieve users from the need to memorize different passwords for different services. The advantage of these other information being perhaps easier to memorize is offset by the inconvenience of entering them.

Preferably, the authentication method should be as easy to use as current password-based methods, require no additional devices, induce no or only marginal additional costs to deploy, and relieve users from memorizing many complex passwords without compromising security. An authentication method satisfying these criteria is disclosed here.

BRIEF SUMMARY OF THE INVENTION

The disclosed method is an enhancement of known authorization and authentication methods, like log-in/password, where the user is authorized or authenticated by a secret code. When setting up an account with a computer, the user choses a user name, a secret code (password, PIN, or authorization code), additional information, which serve as "hints" to the code, and defines conditions for presenting them. In the authentication process, as the user enters the password, the computer presents the hints, which help the user to recall remaining parts of the password.

For example, a user who has several computer accounts might choose a same character sequence as the beginning (the prefix) for all passwords. For increased security, the user chooses a different character sequence as the rest (suffix) of the password for each of the computers. The complete password is formed by simply concatenating the prefix with the suffix. To avoid having to memorize which suffix is valid for which computer, the user chooses a hint for each suffix. Each computer stores the hint which is associated with the user's password for it. During the log-in process, after the user has entered the correct user name and the password prefix, the computer presents the hint, reminding the user of the suffix which forms the rest of the password. For convenience, the hints may also refer to the user name and be presented already while the user is entering it.

Some examples of hints and the associated suffixes are: User's favorite book's title as the hint and a quote from it as the password suffix; a picture of user's pet and the pet's name; a recording with user's mother's voice and mother's maiden name; and similar. The user is free to choose the suffixes and the hints, but they should preferably be something personal, something known only to the user. Even if someone, like a close friend or a relative, knows the user so well to be able to "decode" the hint (that is, deduce the password suffix from the hint), without knowing the prefix he or she still cannot obtain access to the protected domain.

The disclosed method exploits the fact that people can more easily recognize something when they see or hear it than to consciously remember it. This is similar, and the security is comparable, to the security question scheme, but the method disclosed here is much more convenient to use. As such, it provides considerable advantage over prior art. The same approach may also be used for anonymous authorization. In this case, the hints are presented as the user enters the authorization code.

DETAILED DESCRIPTION OF THE INVENTION

Figure 1:
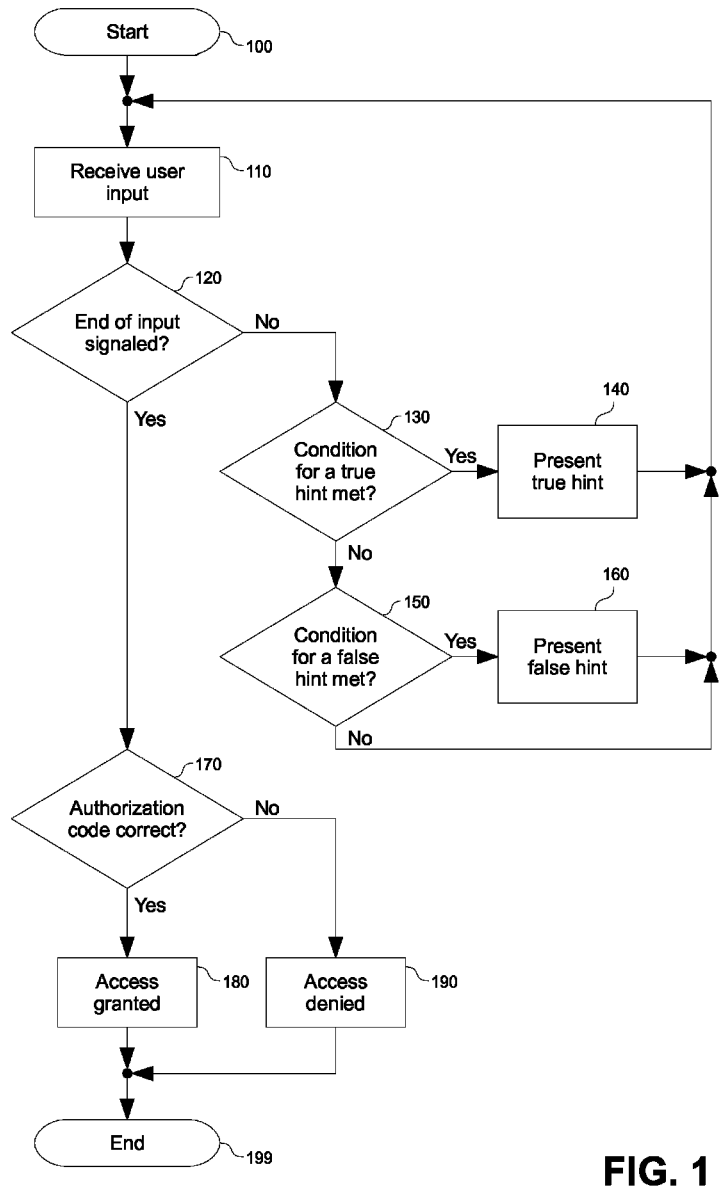
FIG. 1 is a flow diagram showing user authorization using the embodiment of the invention in which the user signals the end of authorization code.

The disclosed method is an enhancement of prior art authorization and authentication methods based on a secret code. Although its anticipated use is primarily in computers and computer-based systems, networks, and services, it can be used everywhere where such methods belonging to prior art are used and where the authenticating party can provide the user with information which have been agreed upon in advance. This includes, but is not limited to, computers, handheld devices, cellular phones, physical locks, anti-theft devices for cars, vaults, and similar. For clarity and simplicity, the term "computer" will be used throughout the disclosure, but it should be understood in a broader sense, as meaning any type of device, apparatus, system, or service which can receive user input, store information, compare them, and, based on the result of the comparison, provide output and grant or refuse access or usage rights.

As in prior art, when setting up an account with a computer, the user and the computer agree on access information: user name and password, authorization code, or similar. In addition, the user may choose separate information, which serve as "hints" to the secret code. The hints may also be related to public information, like the user name. In this latter case, the hints are a convenience and not a security feature. In both cases, the hints may be words, sentences, images, sounds, animated clips, vibration patterns, or other type of information. In the authentication process, as the user enters the identifying and authenticating information, the computer presents the hints, which help the user to recall remaining identifying or authenticating information. The exact conditions when to present a hint may be pre-defined, or, preferably, the user may define them when choosing the hint. For example, the user may decide for the first hint to be presented after the fourth correct letter of the password has been entered, and the second hint after the seventh letter.

The method may also be used for anonymous authorization, without identifying the user. In this case, the computer presents the hints as the user enters the authorization code. For many computers and similar systems, where the correspondence between the identifying information (like the user name) and the real-world identity of the physical person is not checked, the distinction between authentication and anonymous authorization is of little practical relevance, at least as far as granting access is concerned. For example, many web-based e-mail services allow users to set up accounts under arbitrary, even fictional user names, without checking, or even knowing the user's physical identity. Thus, the user name can be seen as the public part of the authorization code, and not as identifying information. For clarity and simplicity, the term "authorization" will be used throughout the disclosure, meaning both anonymous authorization and user identification and authentication.

In a preferred embodiment, the user is as free as possible in choosing the hints. The limitations should preferably be only of technical nature, for example barring very large images as hints or, in case of textual hints, barring special, non-printable characters. There should be little or no limitations on the semantical content of the hints. This way, the user can choose hints as personal reminders to the authorization code or to its parts. If carefully chosen, such hints can be of little or no use to others, even if they would acquire knowledge of them.

An effective way of choosing strong authorization codes is to construct them as a concatenation of several words or other letter sequences. The hints may then be used as reminders to the words and each presented preferably only after the previous word has been correctly entered. If the hints are carefully chosen, they will lead the user to the correct word, but be of little help to other people, including attackers. For even higher security, the user might wish to memorize the first word in the concatenation and to provide no hint at all for it. This way, a potential attacker would need to know the beginning of the authorization code to receive even the first hint.

To manage different authorization codes for different computers without the need to memorize too much information, the user may choose the same first word for all authorization codes. The complete codes, one for each computer, would differ in the remaining words which comprise them. These words, comprising the password suffix, need not to be explicitly memorized. Instead, the hints should be chosen to remind the user (and, preferably, no-one else) of them. For the authorization process, the computers may be configured to present the hint for the next word in the concatenation only after the correct previous word has been entered.

For example, a user of two computers may choose a complex character sequence "b7hq#]" as the beginning for both authorization codes. For the first computer, the user chooses "Garfield", the name of his or her pet, as the second word in the code, and his or her mother's phone number, 12345678, as the third letter sequence in the code. The complete authorization code for the first computer is thus "b7hq#]Garfield12345678". The user chooses the pet's picture and a recording of his or her mother's voice as the hints. For the second computer, the user chooses "Jennifer" (the name of his or her violinist friend) and "Fred's BBQ" (his or her favorite restaurant), producing the authorization code "b7hq#]JenniferFred's BBQ". For the hints, the user chooses a violin sound and an interior photo of the restaurant. (Of course, the user is free to choose the authorization codes and the hints as he or she deems fit, so this example presents only a suggested mode of usage.)

During the authorization for the first computer, after the user has entered "b7hq#]", the computer shows Garfield's picture. After the user enters "Garfield", the computer plays the recording of the user's mother's voice. Access is granted only after the user has entered the correct phone number, "12345678". Similarly, the second computer plays a violin sound after the user has entered the prefix "b7hq#]" and shows the restaurant photo after the user has entered "Jennifer". The access is granted after the user has entered "Fred's BBQ".

In another embodiment, the order in which the hints are presented is not fixed, but the computer may randomly choose which one to present after a part of the authorization code has been entered. After the user has entered "b7hq#]", the first computer may randomly choose whether to show Garfield's picture and expect "Garfield" as the next part of the authorization code, or to play the recording of the user's mother's voice and expect "12345678". The second computer may act in the same way. Thus, the complete valid authorization code depends on the order in which the computer presents the hints.

In yet another embodiment, the computer presents only a subset of stored hints and expects only corresponding words as user entries. This is particularly suitable when the user has defined many words and corresponding hints. The computer may randomly choose how many of the available hints to present as the user enters the corresponding parts of the authorization code.

An attacker, trying to obtain access to the computers, would first need to guess or otherwise discover the beginning of the authorization codes (the sequence "b7hq#]" in the above examples). But even then, he or she would need to know enough about the user's personal background in order to deduce the rest of the authorization codes. The first character sequence in the authorization code—the password prefix—has some resemblance with "master password" used in some security systems, but is less sensitive. Revealing it gives an attacker access only to the first hint, and not to all passwords protected by the "master password".

In theory, a set of authorization codes or passwords formed in this way is less secure than a set of completely unrelated passwords. In practice, however, most people cannot memorize many non-trivial passwords and opt for either many simple, low-security passwords, a same password for many computers, or keep many passwords written down somewhere. The disclosed method is more secure than any of these alternatives.

If the computer would present hints only after the previous part of the authorization code has been entered correctly and provide no output otherwise, the code could be broken part-by-part, e.g. by brute force: The attacker might try all combinations for the first word of the code until the computer presents a hint, thus signaling the attacker that the first part of the code has been found. The rest of the code can be found by repeating the procedure. To prevent this kind of attack, the computer may output false hints as the user enters the code. One possibility is to output a false hint if the previous part of the code has not been entered correctly. However, this approach effectively discloses the length of the part of the code, enabling the attacker to reduce the search space when guessing the code.

A much better option is to present false hints under conditions unrelated to conditions for presenting a true hint. For example, if the first word of the code is six characters long, a true hint may be presented after the the whole first word has been entered correctly and a false hint already after a four-character incorrect word has been entered. Yet better possibility is to provide a false hint after every character, except when a true hint should be presented. Taking again the example where the first word is six characters long, the computer would present a false hint after the first, second, third, fourth and fifth entered character, and a true hint after the user has entered the sixth character. In other words, a hint (true of false) is presented after each character entered by the user.

The attacker, not being able to distinguish false from true hints, cannot obtain any useful information from the presented hints. Only the legitimate user, being the one who has chosen the true hints, can recognize them and utilize them for recalling the authorization code.

In the above example it was assumed that the authorization code is a character sequence which can be entered over a keyboard. However, the disclosed method is not limited to a certain type of authorization code or to an input device. The code can equally well be a sequence of sounds input over a microphone, a sequence of gestures performed using a pointing device or in front of a camera, a combination of these, and similar. It suffices that the code is formed as a sequence of chunks and that the computer can recognize the chunks. Those skilled in the art will be able to devise many more kinds of authorization codes and ways of inputting them.

FIG. 1 shows a flow diagram of the authorization process in an embodiment where the number of hints to present is fixed and known to the user. The authorization starts with step 100. In step 110, the computer receives user input, for example a single keystroke or a gesture. Special, predefined inputs, like pressing the ENTER key or clicking the "Log in" button with the mouse, serve as signals for end-of-input. The computer determines whether the input is such a signal (step 120). If not, the computer determines if conditions for presenting a hint have been met. If a condition for presenting a true hint has been met (step 130), the computer presents the hint (step 140) and returns to step 110 to wait for more input. If a condition for presenting a false hint has been met (step 150), it presents the false hint (step 160) and again returns to step 110. Otherwise, if neither of the conditions has been met, the computer returns immediately to step 110.

If it was determined in step 120 that the end of input has been reached, the computer determines whether the concatenation of all user input since the start of the authorization process constitutes a valid authorization code (step 170). If yes, the access is granted (step 180). Otherwise, the access is denied (step 190). The authorization process ends with step 199.

Figure 2:
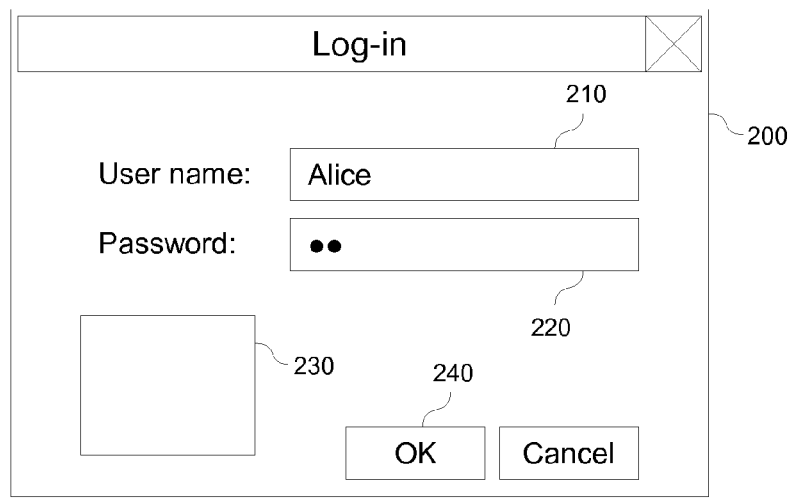
FIG. 2 shows an exemplary user interface for user authorization in a state where no hint is presented.

FIG. 2 shows an exemplary user interface 200 for utilizing the disclosed method. The interface contains an entry field for the user name 210, an entry field for the password 220, and an area 230 for displaying visual hints. The "OK" button 240 is a special input element for signaling the end of input. FIG. 2 shows the interface in a state in which no condition for presenting hints has been met. Therefore, the area 230 is empty.

Figure 3:
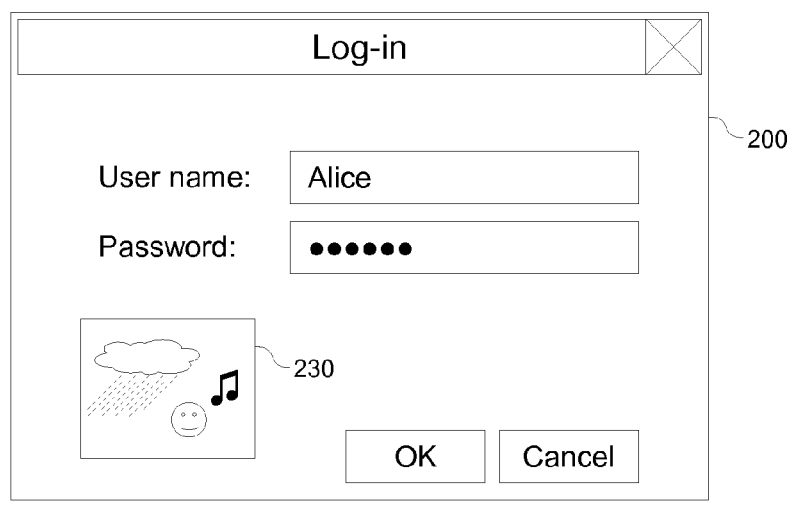
FIG. 3 shows the same exemplary user interface in a state where a visual hint is presented.

FIG. 3 shows the same user interface in a later state, after the user has entered some more password letters. Now, a condition for presenting a hint has been satisfied and the area 230 shows a visual hint.

Figure 4:
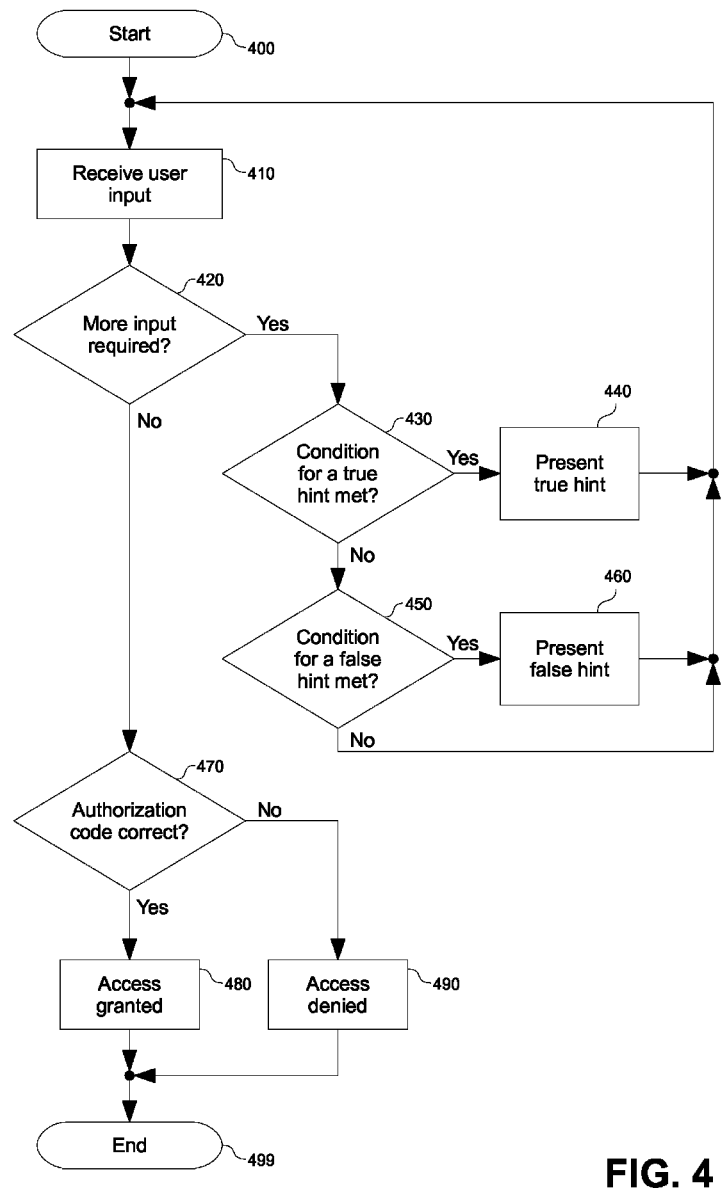
FIG. 4 is a flow diagram showing user authorization using another embodiment of the invention in which the computer decides whether to require more input.

FIG. 4 shows a flow diagram of the authorization process in an embodiment where the computer decides how many hints to present before deciding whether to authorize the user. The process is almost identical to the process shown in FIG. 1. The only difference is that here the computer, and not the user decides whether the authorization code is complete or whether more input is needed. The authorization starts with step 400. In step 410, the computer receives user input. The computer determines whether the input suffices to decide whether to authorize the user or not, or whether more input is required (step 420). If more input is required, the computer determines if conditions for presenting a hint have been met. If a condition for presenting a true hint has been met (step 430), the computer presents the hint (step 440) and returns to step 410 to wait for more input. If a condition for presenting a false hint has been met (step 450), it presents the false hint (step 460) and again returns to step 410. Otherwise, if neither of the conditions has been met, the computer returns immediately to step 410.

If it was determined in step 420 that no more input is required, the computer determines whether the concatenation of all user input since the start of the authorization process constitutes a valid authorization code (step 470). If yes, the access is granted (step 480). Otherwise, the access is denied (step 490). The authorization process ends with step 499.

The decision whether to present a true or a false hint (steps 130 and 150 in FIG. 1 and steps 430 and 450 in FIG. 4) depends on previously received user input. The computer must be able to compare the input with parts of the authorization code. Therefore, the computer cannot store only one-way information derived from the complete code, like its hash or message digest. Instead, the code must be stored either in a form which allows its reconstruction, for example in plaintext or encrypted with a key known to the computer, or, preferably, as a list of one-way derived information for every part (word) of the code which may influence the decision to present a true hint. The latter approach is preferable because it prevents attackers who have access to computer storage (insiders, like computer administrators, and similar) from retrieving the codes.

Returning to the above example, if the user has chosen "b7hq#]", "Garfield" and "12345678" as the words in the authorization code and defined hints for them, the computer may store a hash value for each of the words and compare these values with hash values of user input when determining whether to show a true hint.

The hints must be stored in a form which allows their reconstruction and presentation to the user. Storing them in a plaintext form is possible, but bears the risk of an insider retrieving them by directly accessing computer storage. A higher level of security may be obtained by storing the hints in an encrypted form. The keys for decrypting the hints should preferably be unknown even to the insider. In a preferred embodiment, the keys are derived from user input, e.g. as hash values of parts of the input.

Returning again to the above example, if the user has chosen "b7hq#]", "Garfield" and "12345678" as words in the authorization code and Garfield's picture and mother's voice as the hints for the second and the third word, the computer may store the hints encrypted with a hash value of the first word, "b7hq#]", as the key. A symmetric cryptographic algorithm, like DES or AES is used for encryption, so the same key can be used for decrypting the hints. Also as an example, in an embodiment where the order and the number of hints to present is fixed in advance, the hint for each word may be encrypted using the value derived from the previously entered word as the key. For example, if the complete authorization code is "b7hq#]Garfield12345678", Garfield's picture may be encrypted using a hash value of "b7hq#]" and mother's voice using a hash value of "Garfield", or, alternatively, of "b7hq#]Garfield", as the keys.

I claim:

1. A user authorization method for granting access within a log-in process where a user has to enter a user name and an authorization code and access is granted only if the entered authorization code matches a valid authorization code, comprising the steps of:

receiving an input for an authorization code from a user, presenting, using a computer, at least one hint to the user while the user is entering the authorization code; determining whether the entered authorization code matches a valid authorization code; that the authorization code being a concatenation of several parts, one part being a password prefix and at least one part being a password suffix, wherein true hints chosen by the user as personal reminder for reminding the user to the password suffix or parts of the password suffix are only provided if pre-defined conditions, when to present a true hint, are met, further comprising the steps of selectively providing either a true hint or a false hint, providing true hints for reminding the user to the password suffix Only when conditions when to present a true hint are met, the authorization code being a concatenation of several chunks, several words, or several character sequences, the authorization code having a number of user-defined true hints and conditions for presenting such hints associated with it, providing, the true hints chosen by the user as personal reminder to recall the next chunk, word, or character sequence within the concatenation only after the previous chunk, word, or character sequence has been entered correctly providing false hints after a predetermined number of characters has been entered except when the conditions to present a true hint are met, the predefined number of characters being less than the number of characters of the chunk, word, or character sequence of the part of the authorization code.

2. The method of claim 1 characterized in that the log-in process is a two-step process with an entry field (210) for entering the user name and an entry field (220) for entering the authorization code.

3. The method of claim 1 characterized in that no hints at all are provided for the password prefix.

4. The method of claim 1, characterized in that said valid authorization code is a previously stored code, preferably with a fixed order and number of parts, each part of the password having a true hint associated with it.

5. The method of claim 1, characterized in that said valid authorization code is randomly chosen from previously stored parts with available true hints.

6. The method according to claim 1, characterized in that several parts comprise the password suffix and true hints are provided for each part of the password suffix, if pre-defined conditions, when to present a true hint, are met.

7. The method according to claim 1, characterized in that false hints are presented during entering of the authorization code.

8. The method according to claim 5, characterized in that hints are provided after entering of every character, with false hints being presented, except when a true hint should be presented.

9. The method according to claim 5, characterized in that false hints are provided after entering of a pre-defined number of characters, except when a true hint should be presented, with the pre-defined number of characters being less than the number of characters of the said part of the authorization code.

10. The method according to claim 1, characterized in that the hints are stored in any encrypted form, wherein preferably, the keys for decrypting the hints are derived from the user input, especially from hash values of any of the previously entered parts of the authorization code.

11. The method according to claim 1, characterized in that every part of the authorization code is stored as one-way derived information for this part and deciding whether the code entered by the user was correct without exposing protected information.

* * * * *